(12) United States Patent
Tiana

(10) Patent No.: US 10,991,261 B1
(45) Date of Patent: Apr. 27, 2021

(54) GLIDESLOPE VISIBILITY MONITOR

(71) Applicant: Rockwell Collins, Inc., Cedar Rapids, IA (US)

(72) Inventor: Carlo L. Tiana, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 173 days.

(21) Appl. No.: 16/059,675

(22) Filed: Aug. 9, 2018

(51) Int. Cl.
| | |
|---|---|
| *G06T 1/20* | (2006.01) |
| *G01C 22/00* | (2006.01) |
| *G08G 5/02* | (2006.01) |
| *G01C 23/00* | (2006.01) |
| *G08G 5/00* | (2006.01) |
| *G01N 21/47* | (2006.01) |
| *G01J 3/44* | (2006.01) |
| *G01S 13/91* | (2006.01) |
| *G01S 1/02* | (2010.01) |
| *G01C 5/00* | (2006.01) |
| *G01S 1/18* | (2006.01) |

(52) U.S. Cl.
CPC ............ *G08G 5/025* (2013.01); *G01C 5/005* (2013.01); *G01S 1/022* (2013.01); *G01S 13/913* (2013.01); *G01S 1/18* (2013.01)

(58) Field of Classification Search
None
See application file for complete search history.

(56) References Cited

U.S. PATENT DOCUMENTS

| | | | | |
|---|---|---|---|---|
| 3,519,354 A | * | 7/1970 | Hazel .................... | G01N 21/538 356/342 |
| 3,528,740 A | * | 9/1970 | Gerry ........................ | G01J 3/44 356/5.03 |
| 3,650,627 A | * | 3/1972 | Noxon .................. | G01N 21/538 356/5.03 |
| 4,502,782 A | * | 3/1985 | Werner ................... | G01S 17/14 356/5.08 |

(Continued)

OTHER PUBLICATIONS https://www.faa.gov/about/office_org/headquarters_offices/ato/service_units/techops/navservices/lsg/rvr/media/FAA-E-2772B.pdf, Department of Transportation Federal Aviation Administration, Performance Specification PC Based Runway Visual Range (RVR) System, FAA-E-2772B, Aug. 22, 2006, Section 3.2.1.3.1, p. 7.

(Continued)

*Primary Examiner* — Adam D Tissot
*Assistant Examiner* — Laura E Linhardt
(74) *Attorney, Agent, or Firm* — Suiter Swantz pc llo

(57) ABSTRACT

An airfield visibility monitoring system may include a measurement unit to emit one or more pulses of electromagnetic radiation along an aircraft glideslope associated with a runway and detect backscattered radiation from the glideslope associated with the emitted pulses. The measurement unit may further determine round-trip times between emission of the one or more pulses and detection of the backscattered radiation. The system may further include a controller. The controller may determine values of a visibility metric for multiple distances from the measurement unit along the glideslope based on the detected backscattered radiation and round-trip times, determine values of the visibility metric for multiple altitudes based on the values of the visibility metric along the glideslope, and direct an airfield communication unit to broadcast values of the visibility metric for at least some of the altitudes.

19 Claims, 4 Drawing Sheets

(56) References Cited

U.S. PATENT DOCUMENTS

2008/0164411 A1* 7/2008 Kerr ................. G01C 23/00
250/330
2010/0305786 A1* 12/2010 Boorman ............ G08G 5/025
701/16

OTHER PUBLICATIONS https://www.faa.gov/documentLibrary/media/Order/6560.10C.pdf, "Runway Visual Range (RVR)", U.S. Department of Transportation, Federal Aviation Administration, Order 6560.10C, Effective Date Jan. 20, 2011, 9 pages.

* cited by examiner

GLIDESLOPE VISIBILITY MONITOR

BACKGROUND

Atmospheric visibility at or near a runway is one of the main factors in determining the viability of an approach for landing an aircraft. For example, different classes of instrument approaches are defined based on runway visual range (RVR) measurements taken at one or more locations along a runway. Further, pilots must typically visually identify the landing environment of a runway by a decision height before executing a landing. However, visibility and associated RVR measurements may be highly location-specific and may vary significantly, even along the runway. RVR measurements taken along the runway may thus provide only limited information to a pilot and do not provide an indication of actual visibility along a glideslope of a landing approach (e.g., a glidepath or an approach slope) in assessing whether the landing environment is expected to be visible at the decision height.

Further, atmospheric visibility is typically governed by scattering and/or absorption of light by the atmosphere or additional particles such as clouds, smoke, haze, and the like. Aircraft may thus include instrumentation to provide additional data to a pilot that may provide enhanced visibility beyond human vision. For example, an enhanced vision system (EVS) may include cameras and/or sensors to provide a pilot with a video display to supplement a view from the cockpit. An EVS may utilize electromagnetic radiation of any wavelength such as, but not limited to, visible, infrared, or radio-frequency (RF) wavelengths to provide visualization data. In the case of visible wavelengths, an EVS may use visible-wavelength instrumentation that is more sensitive than a human eye. In the case of non-visible wavelengths (e.g., wavelengths not visible to the human eye), an EVS may provide enhanced visualization capabilities. An EVS may thus provide enhanced visibility beyond what RVR measurements along a runway may suggest. However, visibility based on an EVS on an aircraft may not be verifiable by an airport and may not always be relied on during an instrument approach.

SUMMARY

In one aspect, embodiments of the inventive concepts disclosed herein are directed to an airfield visibility monitoring system. The airfield visibility monitoring system may include a measurement unit to emit one or more pulses of electromagnetic radiation along an aircraft glideslope associated with a runway and detect backscattered radiation from the glideslope associated with the emitted pulses. The measurement unit may further determine round-trip times between emission of the one or more pulses and detection of the backscattered radiation. The airfield visibility monitoring system may further include a controller. The controller may determine values of a visibility metric for multiple distances from the measurement unit along the glideslope based on the detected backscattered radiation and round-trip times. The controller may further determine values of the visibility metric for multiple altitudes based on the values of the visibility metric along the glideslope. The controller may further direct an airfield communication unit to broadcast values of the visibility metric for at least some of the altitudes.

In a further aspect, embodiments of the inventive concepts disclosed herein are directed to an airfield visibility monitoring system. The airfield visibility monitoring system may include a measurement unit to emit one or more pulses of electromagnetic radiation along an aircraft glideslope associated with a runway and detect backscattered radiation from the glideslope associated with the emitted pulses. The measurement unit may further determine round-trip times between emission of the one or more pulses and detection of the backscattered radiation. The airfield visibility monitoring system may further include a controller. The controller may determine values of a visibility metric at an altitude corresponding to a decision height for an approach to the runway. The controller may further direct an airfield communication unit to broadcast values of the visibility metric for the decision height.

In a further aspect, embodiments of the inventive concepts disclosed herein are directed to a method for monitoring airfield visibility. The method may include emitting one or more pulses of electromagnetic radiation along an aircraft glideslope associated with a runway. The method may further include detecting backscattered radiation from the glideslope associated with the emitted pulses. The method may further include determining values of a visibility metric for multiple distances from the measurement unit along the glideslope based on the detected backscattered radiation and round-trip times. The method may further determine values of the visibility metric for multiple altitudes based on the values of the visibility metric along the glideslope. The controller may further broadcast values of the visibility metric for at least some of the altitudes.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
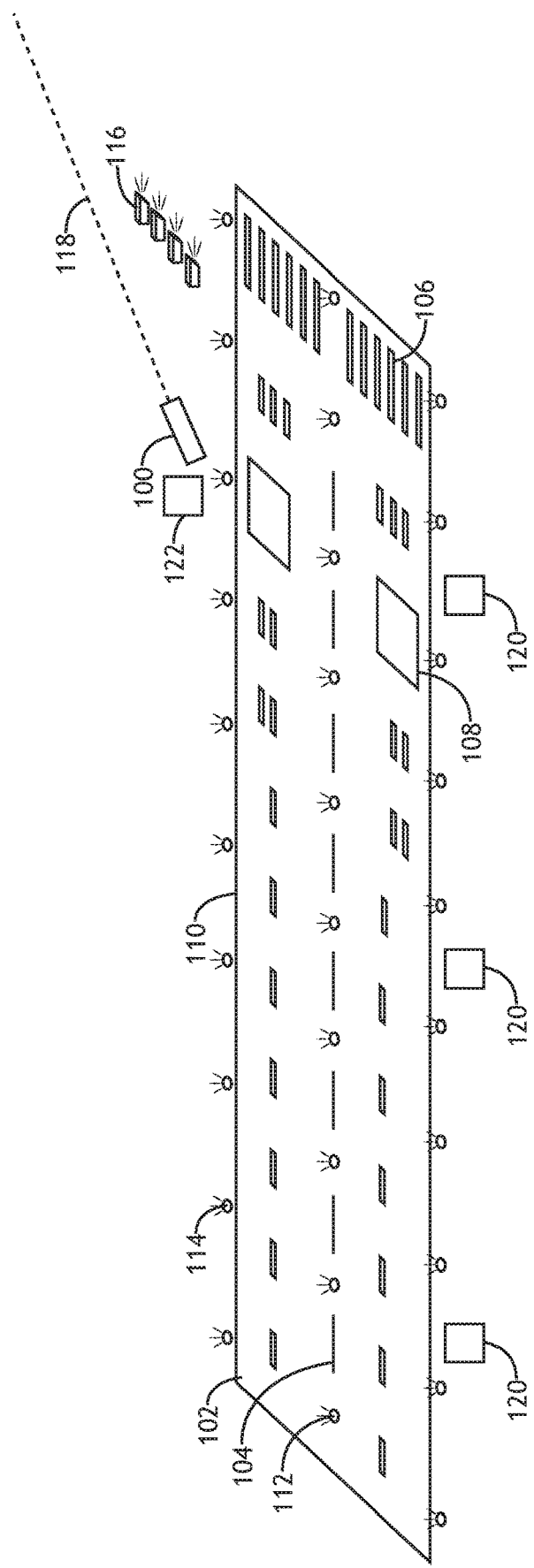
FIG. 1 is a conceptual view of a glideslope visibility monitoring system positioned along a runway according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to measuring atmospheric visibility along the glideslope for aircraft approaching a runway. In some embodiments, a glideslope visibility monitor measures atmospheric visibility along one or more points along the glideslope. For example, a glideslope visibility monitor may be positioned along the runway near a touchdown point and oriented to provide measurements along the glideslope. It is recognized herein that the glideslope may have any trajectory and may vary for different runways, for different airports, or for different aircraft. In some instances, a glideslope corresponds to a linear trajectory at an angle of approximately 3-5 degrees with respect to a runway.

In some embodiments, the glideslope visibility monitor determines atmospheric visibility by emitting pules of electromagnetic radiation (e.g., visible wavelengths, IR wavelengths, or RF wavelengths) along the glideslope and monitoring backscattered radiation returning from the glideslope. For example, a ratio of the intensity of a backscattered pulse to an emitted pulse may provide an indication of scattering and absorption along the glideslope. Further, a round-trip time between emission of a pulse and measurement of a backscattered pulse may provide an indication of a location of a scattering site along the glideslope. The intensity of backscattered pulses as a function of time may be utilized to determine visibility at multiple points along the glideslope.

The glideslope visibility monitor may determine atmospheric visibility along the glideslope at one or more wavelengths to provide data relevant for different contexts. For example, the glideslope visibility monitor may determine atmospheric visibility based on visible wavelengths, which may be indicative of what a pilot may expect to visualize unaided. By way of another example, the glideslope visibility monitor may determine atmospheric visibility based on operating wavelengths of an EVS, which may be indicative of what the pilot may expect to visualize with the assistance of the EVS. It is further recognized herein that determining visibility along the glideslope at operational wavelengths of an EVS may facilitate the use of EVS systems during landings.

Further, visibility data determined at one or more locations along the slope may be converted, based on the known glideslope, to altitude data. For example, visibility data may be presented in the form of height above ground level (AGL), or elevation above sea level.

In some embodiments, visibility information is utilized to provide actionable data to pilots. For example, glideslope visibility data may be used to identify a distance at which a landing environment is expected to be visible. By way of another example, an airport may utilize glideslope visibility data to indicate to a pilot that under certain conditions, a visual approach is not supported, but an EVS-assisted approach is supported.

Visibility information along a glideslope or associated data may be provided to pilots in any form. In some embodiments, visibility information is provided through broadcasts associated with weather systems such as, but not limited to, a METAR (e.g., an aviation routine weather report) broadcast or an automated surface observing system (ASOS) broadcast. In some embodiments, visibility information is provided through an electronic flight bag (EFB).

Referring now to FIG. 1, a conceptual view of a glideslope visibility monitoring system 100 positioned along a runway 102 in accordance with an embodiment of the inventive concepts disclosed herein is shown. A runway 102 may include markings such as, but not limited to, centerline markings 104, threshold markings 106, aiming point markings 108, or edge markings 110. A runway 102 may further include lighting associated with a landing environment such as, but not limited to, centerline lights 112, edge lights 114, or precision approach path indicator (PAPI) lights 116. In some embodiments, the glideslope visibility monitoring system 100 is positioned along the runway 102 at a position suitable for monitoring the glideslope 118. For example, the glideslope visibility monitoring system 100 may be, but is not required to be, positioned near aiming point markings 108 at an intersection of the glideslope 118 with the runway 102.

In some embodiments, the glideslope visibility monitoring system 100 is integrated with or otherwise attached to one or more additional systems located on or near a runway 102. For example, the glideslope visibility monitoring system 100 may be integrated with an RVR meter 120 for monitoring visibility along the runway 102. By way of another example, the glideslope visibility monitoring system 100 may be integrated with weather monitors such as, but not limited to, an ASOS station 122.

Figure 2:
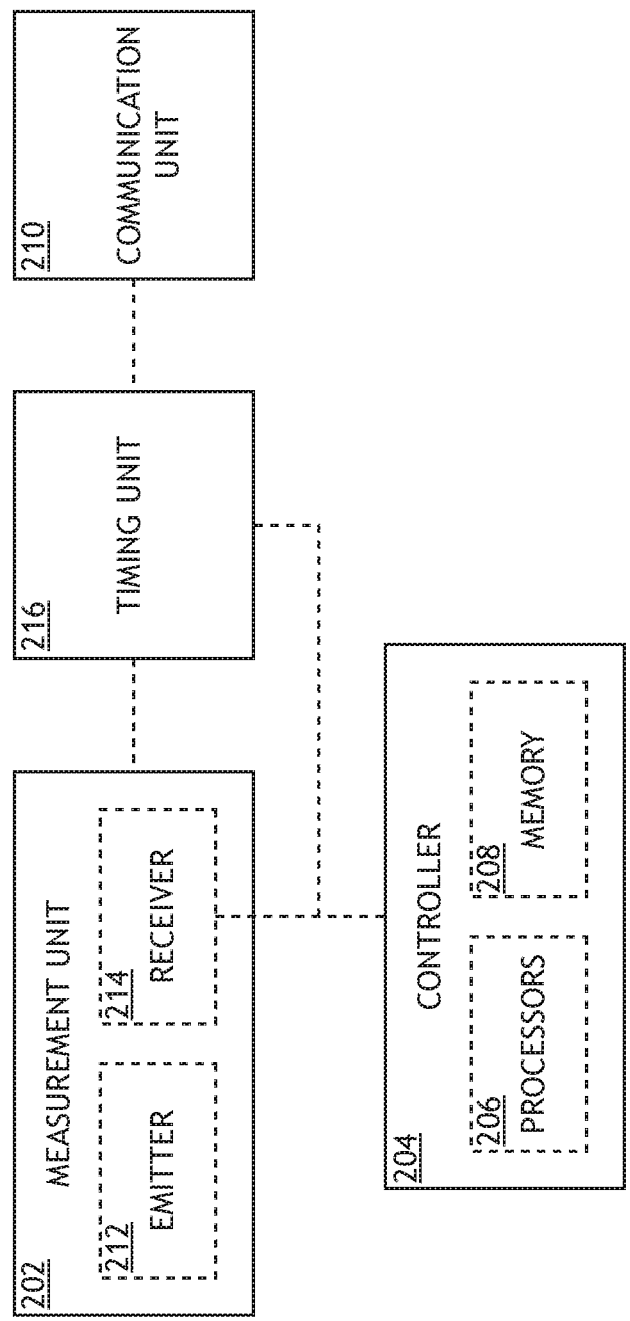
FIG. 2 is a diagrammatic view of a glideslope visibility monitoring system configured according to the inventive concepts disclosed herein.

Referring now to FIG. 2, a diagrammatic view of a glideslope visibility monitoring system 100 configured in accordance with an embodiment of the inventive concepts disclosed herein is shown.

In some embodiments, the glideslope visibility monitoring system 100 includes a measurement unit 202 to gather data indicative of visibility along the glideslope 118 and a controller 204 including one or more processors 206 configured to execute program instructions maintained on a memory medium 208. In this regard, the one or more processors 206 of controller 204 may execute any of the various process steps described throughout the present disclosure. For example, the processors 206 may determine atmospheric visibility at one or more points along the glideslope 118 based on data from the measurement unit 202.

In some embodiments, the glideslope visibility monitoring system 100 includes a communication unit 210 (e.g., an airfield communication unit) to broadcast data indicative of the atmospheric visibility generated by the controller 204 based on data from the measurement unit 202. In this regard, pilots may utilize the atmospheric visibility data when evaluating an approach to the runway 102.

The communication unit 210 may include any components known in the art suitable for broadcasting atmospheric visibility data. For example, the communication unit 210 may include one or more wireless transmitters. Further, the communication unit 210 may broadcast at any frequency or using any standard. In one instance, the communication unit 210 includes an RF transmitter (e.g., an RF antenna and associated drive circuitry) to broadcast atmospheric visibility data using radio frequencies.

Further, the communication unit 210 may broadcast any type of data associated with the atmospheric visibility. For example, the communication unit 210 may broadcast values of atmospheric visibility based on any metric such as, but not limited to, MOR, RVR, or a variation thereof. By way of another example, the communication unit 210 may broadcast data or instructions based on the atmospheric visibility along the glideslope 118 such as, but not limited to, an expected altitude (e.g., AGL or height above sea level) along the glideslope 118 at which a landing environment (e.g., centerline lights 112, edge lights 114, or PAPI lights 116) is expected to be visible or whether certain approaches (e.g., certain instrument approach classes or EVS-assisted approaches) are allowed.

Data broadcast by the communication unit 210 may be received by an aircraft using any type of receiver. For example, RF data broadcast by the communication unit 210 may be received by an RF receiver on an aircraft. Further, the data broadcast by the communication unit 210 may be provided to the pilot in any form including visual and/or audio content. In some embodiments, data broadcast by the communication unit 210 including values of atmospheric visibility metrics or other associated data is displayed on a display device (not shown) such as, but not limited to, a liquid crystal display (LCD), a light-emitting diode (LED) display, or an organic light-emitting diode (OLED) display. Further, the display may include a user interface. In this regard, a pilot may interact with the atmospheric visibility data. For instance, a pilot may selectively display atmospheric visibility data at different resolutions (e.g., at selected AGL intervals). In another instance, a pilot may selectively view atmospheric visibility data in textual or graphical forms (e.g., one or more graphs of atmospheric visibility data along the glideslope or as a function of altitude).

The display may include any type of user interface known in the art. For example, the user interface may include, but is not limited to, a keyboard, a keypad, a lever, a knob, a scroll wheel, a track ball, a switch, a dial, a sliding bar, a scroll bar, a slide, a handle, a touch pad, a paddle, a steering wheel, a joystick, or a bezel input device. In some embodiments, the user interface includes a touchscreen interface device such as, but not limited to, a capacitive touchscreen, a resistive touchscreen, a surface acoustic based touchscreen, or an infrared based touchscreen.

Figure 3:
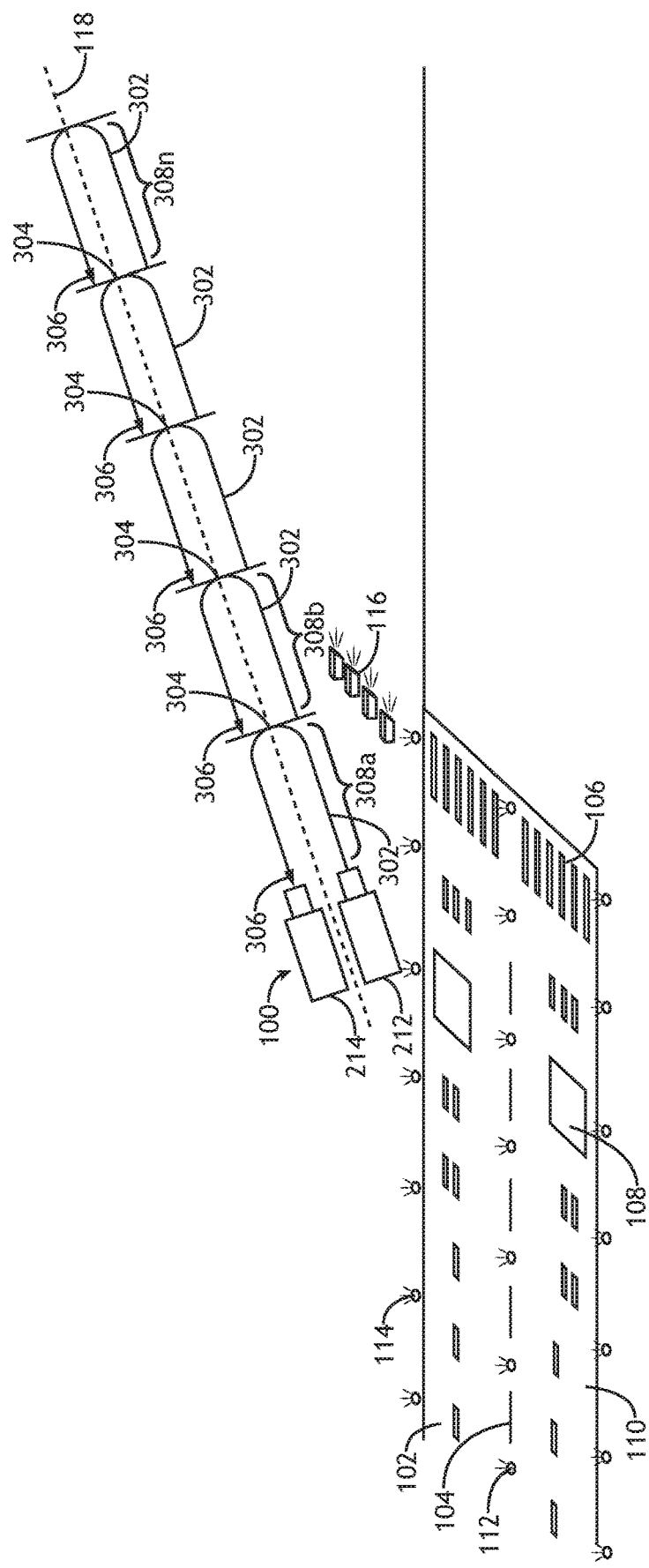
FIG. 3 is a conceptual view of a measurement unit having an emitter of electromagnetic pulses and a receiver to receive backscattered radiation configured according to the inventive concepts disclosed herein.

In some embodiments, the measurement unit 202 measures backscattered radiation along the glideslope 118 based on pulses of electromagnetic radiation. Referring now to FIG. 3, a conceptual view of a measurement unit 202 having an emitter 212 of electromagnetic pulses and a receiver 214 to receive backscattered radiation configured in accordance with an embodiment of the inventive concepts disclosed herein is shown. An emitter 212 may be positioned to emit one or more outgoing pulses 302 along the glideslope 118. The outgoing pulses 302 may interact with any type of scattering sites 304 along the glideslope 118 such as, but not limited to, gas molecules, water molecules (e.g., in the form of clouds or fog), smoke or haze. Upon interacting with the scattering sites 304, a portion of the energy of the outgoing pulses 302 may propagate back along the glideslope 118 as backscattered radiation 306, which may be detected by the receiver 214. Further, the measurement unit 202 may include a timing unit 216 (e.g., as illustrated in FIG. 2) to measure a round trip time between the emission of a pulse from the emitter 212 and detection of backscattered radiation by the receiver 214.

The emitter 212 may include any type of emitter known in the art suitable for emitting one or more pulses of electromagnetic radiation. In some embodiments, the emitter 212 is a source of spatially and/or temporally coherent pulses such as, but not limited to, a laser source. For example, the emitter 212 configured as a laser source may include, but is not limited to, one or more diode laser sources, one or more vertical-cavity surface-emitting lasers (VCSELs), one or more solid-state lasers, one or more gas laser sources, one or more quantum laser sources, or one or more supercontinuum laser sources. In some embodiments, the emitter 212 is a source of spatially and/or temporally coherent pulses such as, but not limited to, a light-emitting diode (LED) source or a lamp source. In some embodiments, the emitter 212 is an antenna source. In this regard, the emitter 212 may generate pulses having radio frequency (RF) or longer wavelengths. Further, the emitter 212 may generate pulses having any temporal profile. For example, the emitter 212 may generate pulses having durations of any length such as, but not limited to milliseconds, microseconds, nanoseconds, or femtoseconds.

The emitter 212 may generate pulses having any wavelength or combination of wavelengths. Accordingly, the emitter 212 may generate pulses in any spectral band such as, but not limited to ultraviolet (UV) wavelengths, visible wavelengths, infrared (IR) wavelengths, RF wavelengths, or the like. Further, the emitter 212 may simultaneously or sequentially generate pulses having different wavelengths. For example, the emitter 212 may include multiple sources, each configured to generate electromagnetic pulses having different wavelengths. In one instance, the emitter 212 may include a source of visible radiation (e.g., a laser source or an LED source) suitable for determining atmospheric visibility in the visible spectral range to provide an indication of what a pilot may expect to visualize unaided and may further include a source of radiation having wavelengths associated with an EVS (e.g., an infrared source or an RF source) suitable to provide an indication of atmospheric visibility as visualized by the EVS. By way of another example, the emitter 212 may include a tunable source capable of emitting pulses having selected wavelengths. For instance, the emitter 212 may include a tunable laser source capable of emitting coherent light at selected wavelengths. In another instance, the emitter 212 may include a broadband source coupled with one or more filters to provide filter-based tuning of the broadband source.

In some embodiments, the emitter 212 generates a uniform train of electromagnetic pulses. In this regard, characteristics such as, but not limited to, the repetition rate, the intensity of generated pulses, the duration of generated pulses, or the wavelengths of generated pulses may remain uniform over a selected period of time. In this regard, data indicative of atmospheric visibility may be generated based on detected backscattered radiation associated with each pulse. Further, statistical data such as, but not limited to, average values, mean values, or standard deviations associated with multiple pulses having uniform characteristics may be generated to facilitate accurate and robust visibility measurements.

In some embodiments, the emitter 212 simultaneously or sequentially generates one or more electromagnetic pulses in which one or more characteristics are selectively varied. For example, the emitter 212 may generate pulses having different intensities. In this regard, pulses having relatively higher intensities may be used to interrogate atmospheric visibility at longer distances along the glideslope 118 than pulses having relatively lower intensities. By way of another example, the emitter 212 may vary a temporal separation between successive pulses to interrogate different ranges along the glideslope 118 based on the differences in round trip times from scattering sites. In this regard, pulses having relatively short temporal separations (e.g., associated with higher repetition rates) may be used to rapidly interrogate atmospheric visibility at shorter distances along the glideslope 118 and pulses having relatively long temporal separations (e.g., associated with shorter repetition rates) may be used to interrogate atmospheric visibility at longer distances along the glideslope 118.

The receiver 214 may include any type of detector known in the art suitable for measuring backscattered radiation 306 associated with the outgoing pulses 302 generated by the emitter 212. Further, the receiver 214 may include multiple detectors. For example, multiple detectors may be used to detect backscattered radiation 306 associated with outgoing pulses 302 having different wavelengths. In some embodiments, the receiver 214 includes one or more optical detectors to measure optical wavelengths (e.g., ultraviolet wavelengths, visible wavelengths, or IR wavelengths) such as, but not limited to, one or more photodiodes, one or more avalanche photodiodes (APDs), one or more photomultiplier tubes (PMTs), or one or more charge-coupled device (CCD) detectors. In some embodiments, the receiver 214 may include one or more spectroscopic detectors suitable for identifying wavelengths of the backscattered radiation 306. For example, a spectroscopic detector may distinguish backscattered radiation 306 associated with outgoing pulses 302 having different wavelengths. In some embodiments, the receiver 214 includes one or more antennas to detect RF or longer wavelengths.

The timing unit 216 may include any number of components suitable for determining a round trip time between the emission of outgoing pulses 302 by the emitter 212 and detection of associated backscattered radiation 306 by the receiver 214. In some embodiments, the timing unit 216 receives input signals associated with the emission of outgoing pulses 302 and the detection of associated backscattered radiation 306 and further includes a clock to provide a common timing reference for the emitter 212 and the receiver 214. For example, the input signals may be generated directly by the emitter 212 and/or the receiver 214 upon emission and/or detection, respectively. By way of another example, the timing unit 216 may include one or more additional detectors to provide the input signals based on direct measurements of the outgoing pulses 302 or the backscattered radiation 306.

The measurement unit 202 may generate data signals indicative of atmospheric visibility based on the detection of backscattered radiation 306. For example, the data signals may include the intensity of the outgoing pulses 302, the intensity of detected backscattered radiation 306 and/or the intensity ratio of the backscattered radiation 306 to the outgoing pulses 302. For instance, the intensity ratio of the backscattered radiation 306 to the outgoing pulses 302 may depend on the strength of backscattering by the scattering sites 304 and the atmospheric extinction coefficient, both of which are indicative of atmospheric visibility. By way of another example, the data signals may include round trip times between the emission of an outgoing pulse 302 and the detection of backscattered radiation 306 generated by the timing unit 216, which is indicative of the distance along the glideslope 118 to the scattering sites 304.

In some embodiments, the measurement unit 202 operates as a time-gated measurement system. For example, backscattered radiation 306 associated with an outgoing pulse 302 and detected by the receiver 214 may be binned into one or more time ranges. Accordingly, the detected backscattered radiation 306 within each time range (e.g., each bin) may be integrated to provide aggregated data for each time range. It is recognized herein that each time range may correspond to a distance range (e.g., distance ranges 308a-308n) along the glideslope 118. For instance, backscattered radiation 306 associated with the interaction of outgoing pulses 302 with scattering sites 304 within each distance range 308a-308n will reach the detector within corresponding time ranges. Binning the detection of backscattered radiation 306 into time ranges may thus correspond to binning the detection of backscattered radiation 306 into distance ranges 308a-308n. It may be the case that binning the detected backscattered radiation 306 may provide enhanced signal to noise ratio by integrating the detected energy within each bin. In this regard, the atmospheric visibility may be determined for each distance range 308a-308n. Accordingly, the number of bins may be selected to balance the signal to noise ratio and the resolution of the distance ranges 308a-308n at which the atmospheric visibility is determined.

The communication unit 210 may include any type of communication components known in the art suitable for broadcasting data indicative of or otherwise associated with atmospheric visibility along the glideslope 118. In some embodiments, the communication unit 210 includes an RF communicating device for broadcasting data over radio frequencies. For example, the communication unit 210 may include an antenna and associated drive circuitry for converting broadcast data to radio frequencies.

In some embodiments, the communication unit 210 broadcasts atmospheric visibility along the glideslope 118 and/or associated data along with additional information such as, but not limited to, weather data. For example, the communication unit 210 may broadcast atmospheric visibility data along the glideslope 118 along with ASOS data, METAR data, or the like. In some embodiments, the communication unit 210 broadcasts atmospheric visibility along the glideslope 118 and/or associated data in a format suitable for display on an electronic flight bag.

The one or more processors 206 of a controller 204 may include any processing element known in the art. In this sense, the one or more processors 206 may include any microprocessor-type device configured to execute algorithms and/or instructions. In one embodiment, the one or more processors 206 may consist of a desktop computer, mainframe computer system, workstation, image computer, parallel processor, or any other computer system (e.g., networked computer) configured to execute a program configured to operate the glideslope visibility monitoring system 100, as described throughout the present disclosure. It is further recognized that the term "processor" may be broadly defined to encompass any device having one or more processing elements, which execute program instructions from a non-transitory memory medium 208.

The memory medium 208 may include any storage medium known in the art suitable for storing program instructions executable by the associated one or more processors 206. For example, the memory medium 208 may include a non-transitory memory medium. By way of another example, the memory medium 208 may include, but is not limited to, a read-only memory ROM), a random-access memory (RAM), a magnetic or optical memory device (e.g., disk), a magnetic tape, or a solid-state drive. It is further noted that memory medium 208 may be housed in a common controller housing with the one or more processors 206. In one embodiment, the memory medium 208 may be located remotely with respect to the physical location of the one or more processors 206 and controller 204. For instance, the one or more processors 206 of controller 204 may access a remote memory (e.g., server), accessible through a network (e.g., internet, intranet, and the like). Therefore, the above description should not be interpreted as a limitation on the present invention but merely an illustration.

The steps described throughout the present disclosure may be carried out by a single controller 204 or, alternatively, multiple controllers. Additionally, the controller 204 may include one or more controllers housed in a common housing or within multiple housings. In this way, any controller or combination of controllers may be separately packaged as a module suitable for integration into the glideslope visibility monitoring system 100.

Further, the components associated with the glideslope visibility monitoring system 100 may be packaged as discrete components or may be integrated in any combination. In this regard, components of the glideslope visibility monitoring system 100 may be provided within a common housing or in multiple housings. For example, the timing unit 216 may be, but is not required to be, at least partly integrated with either the measurement unit 202 or the controller 204. By way of another example, the controller 204 may be, but is not required to be, at least partially integrated within the measurement unit 202 or may at least partially provided as a stand-alone unit (e.g., a local processing station or a remote server). By way of another example, drive circuitry associated with a communication unit 210 may be, but is not required to be, at least partially integrated in a common housing with an antenna, with the controller 204, or as a stand-alone unit.

Figure 4:
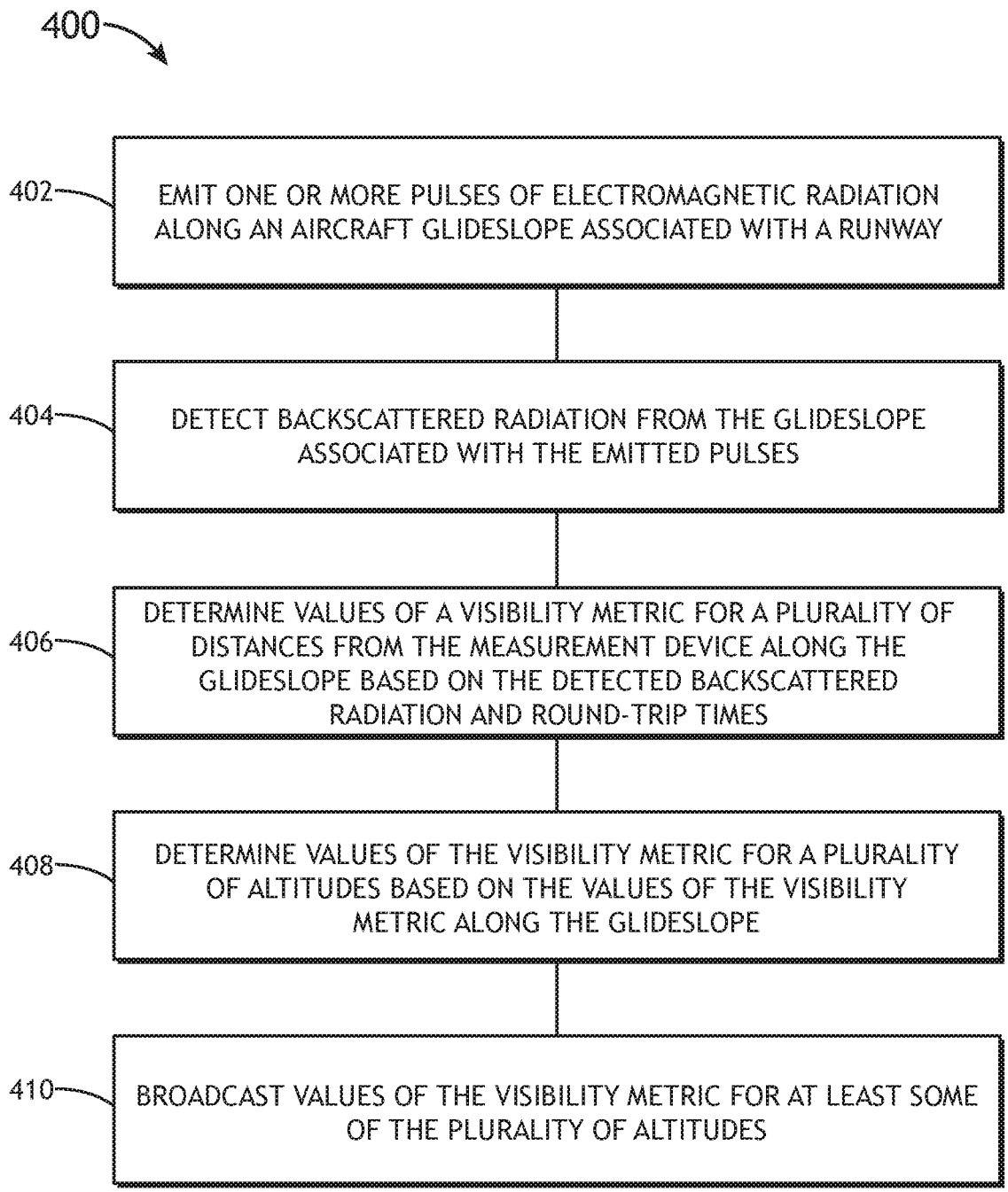
FIG. 4 is a flow diagram illustrating an exemplary embodiment of a method configured according to the inventive concepts disclosed herein.

Referring now to FIG. 4, an exemplary embodiment of a method 400 according to the inventive concepts disclosed herein may include one or more of the following steps. The method 400 may be utilized to provide atmospheric visibility monitoring along the glideslope associated with approach paths to a runway. The embodiments and enabling technologies described previously herein in the context of the glideslope visibility monitoring system 100 should be interpreted to extend to method 400. However, the method 400 is not limited to the architecture of the glideslope visibility monitoring system 100.

A step 402 may include emitting one or more pulses of electromagnetic radiation along an aircraft glideslope associated with a runway. A step 404 may include detecting backscattered radiation from the glideslope associated with the emitted pulses. A step 406 may include determining values of a visibility metric for a plurality of distances from the measurement unit along the glideslope based on the detected backscattered radiation and round-trip times. For example, referring again to FIG. 1, the step 402 may include emitting one or more pulses of electromagnetic radiation along the glideslope 118 associated with the runway 102 and step 404 may include detecting backscattered emission from along the glideslope 118.

The electromagnetic pulses may have any characteristics (e.g., wavelength, pulse duration, intensity, or frequency) suitable for propagating along the glideslope. Further, the step 402 may include emitting two or more classes of pulses having different characteristics (e.g., different wavelengths, different pulse durations, different intensities, or different frequencies) either simultaneously or sequentially. The step 404 may then include the detection of each class of pulses with any number of detectors. In this regard, the different classes of pulses may be selected to interact with the atmosphere in different ways or to provide different levels of sensitivity for a measurement.

For instance, pulses of different wavelengths may experience different amounts of scattering and/or absorption along the glideslope, which may correspond to wavelength-dependent backscattered signal detected in step 404 and corresponding wavelength-dependent visibility metrics determined in step 406. Further, the wavelength-dependent visibility metrics may be relevant for different contexts. For example, visibility metrics based on backscattering of electromagnetic pulses having visible wavelengths may be indicative of what a pilot may expect to visualize unaided. By way of another example, the visibility metrics based on backscattering of electromagnetic pulses having wavelengths associated with an EVS may be indicative of what a pilot may expect to visualize with the assistance of the EVS.

Atmospheric visibility at multiple points along the glideslope may be determined based on emission of a single electromagnetic pulse (e.g., in step 402) of any wavelength and detection of corresponding backscattered radiation as a function of time (e.g., in step 404). For example, a backscattered signal detected at a time t after the emission of a pulse may be associated with a scattering site located at a distance $d_{scatteror}$ from a measurement unit (e.g., measurement unit 202) based on the speed of light c and the round-trip distance $D_{roundtrip}$:

$$d_{scatteror} = \frac{D_{roundtrip}}{2} = \frac{ct}{2}. \tag{1}$$

Further, the ratio of the intensity of the backscattered radiation detected at a given time t to the intensity of the emitted pulse is indicative of atmospheric conditions including, but not limited to, absorption and scattering along the round-trip distance $D_{roundtrip}$.

In some embodiments, multiple atmospheric visibility measurements are generated by emitting multiple pulses in step 402 and detecting the corresponding backscattered radiation in step 404. For example, a train of pulses (e.g., at a selected repetition rate) may provide periodic measurements of atmospheric visibility that may be statistically aggregated to provide a robust and sensitive measurement.

Atmospheric visibility may be determined based on any visibility metric known in the art such as, but not limited to, values of the atmospheric extinction coefficient, MOR values, or RVR values (or equivalents thereof at locations not along a runway). Further, it is recognized herein that some visibility metrics may be calculated from others. For example, values of the MOR may be, but is not required to be, calculated from the atmospheric extinction coefficient based on Koschmieder's Law. By way of another example, an RVR value (or equivalent thereof at locations not on a runway) may be calculated based on the atmospheric extinction coefficient and intensities of runway lights (e.g., centerline lights 112 or edge lights 114) using Allard's Law. In this regard, the step 406 may include, but is not required to include, determining the atmospheric extinction coefficient based on the backscattered radiation detected in step 404 and further using the atmospheric extinction coefficient to determine additional visibility metrics.

It is recognized herein that determining values of atmospheric visibility along the glideslope from the detected backscattered pulses may be an inverse problem that may rely on assumptions and/or additional data to provide a solution. The intensity of detected backscattered radiation associated with scattering sites (e.g., scattering sites 304) along the glideslope in step 404 may depend on multiple factors such as, but not limited to, a strength of backscattering at each scattering site (e.g., a ratio of backscattered intensity to incident intensity) and propagation losses to and from the scattering sites related to the transmittance along the glideslope (e.g., by the Beer-Lambert relation). Further, propagation losses may include absorption as well as scattering by gas molecules, aerosols, clouds, fog, smoke, haze, or the like (e.g., characterized by Rayleigh scattering, Mie scattering, or additional scattering models). Still further, both forward and backscattering strength typically depend on the size and composition of the scattering sites, which is typically not directly measured along a glideslope. Accordingly, various models, assumptions and/or additional data may be utilized to extract values of an atmospheric visibility metric from the detected backscattered radiation.

Further, various approaches may be implemented alone or in combination to determine values of a visibility metric based at least in part on detected backscattered radiation along the glideslope. For example, an atmospheric model may relate the atmospheric extinction coefficient, which is indicative of propagation losses, to an absorption coefficient and an elastic scattering coefficient by a power law, where the value of the power factor varies based on the composition of the atmosphere along the measurement path. In this regard, measuring or approximating the value of the power factor may simplify the calculation. By way of another example, boundary conditions may be measured, assumed or approximated to generate solutions for atmospheric visibility metrics along the glideslope. For instance, a value of an atmospheric extinction coefficient near the runway (e.g., as measured using RVR meters 120 or an ASOS station 122) may be used as boundary conditions. In another instance, a value of an atmospheric extinction coefficient at a far boundary may be assumed or measured (e.g., by a sensor on an aircraft along the glideslope). In a general sense, Light Detecting and Ranging (LIDAR) methods known in the art may be suitable for determining visibility based on detected backscattered pulses along the glideslope, though it is to be understood that the inventive concepts disclosed herein are not limited to LIDAR methods. For example, backscattered radiation based on different classes of emitted pulses (e.g., pulses having different wavelengths, powers, or pulse durations) may be used in combination to facilitate solutions for atmospheric visibility metrics along the glideslope.

It is further recognized herein that the approaches, models, and/or assumptions utilized to determine a value of an atmospheric visibility metric may vary based on the specific conditions. For example, the approaches, models, and/or assumptions may differ for clear conditions, stormy conditions, foggy conditions, or the like. In this regard, the descriptions of particular approaches, models, and/or assumptions utilized to determine a value of an atmospheric visibility metric herein are provided solely for illustrative purposes and should not be interpreted as limiting.

It is recognized herein that the intensity of an electromagnetic pulse will generally decrease the greater the distance traveled due to propagation losses (e.g., absorption and/or scattering). Accordingly, the signal strength and thus the signal to noise ratio of backscattered radiation from a scattering site typically decreases the further the scattering site is along the glideslope. In some embodiments, pulses having different intensities may be used to interrogate different distance ranges (e.g., distance ranges 308a-308n illustrated in FIG. 3). For example, the intensity of pulses used to interrogate atmospheric visibility at distances relatively further from the runway may be higher than those used to interrogate atmospheric visibility at distances relatively closer to the runway. In this regard, a signal to noise ratio may be approximately constant over the measurement range.

A step 408 may include determining values of the visibility metric for a plurality of altitudes based on the values of the visibility metric along the glideslope. It may be the case that providing visibility as a function of altitude may be more useful to pilots than visibility as a function of distance along the glideslope. For example, a pilot may be interested in atmospheric visibility at the decision height associated with an approach. Accordingly, the visibility data of step 406 may be converted in step 408 to any altitude metric known in the art such as, but not limited to height above ground level (AGL) or height above sea level.

A step 410 may include broadcasting values of the visibility metric for at least some of the plurality of altitudes (e.g., the decision height or any number of selected altitudes). The step 410 may include broadcasting values of the atmospheric visibility metric using any technique known in the art. For example, the step 410 may include, but is not required to include, broadcasting values of the atmospheric visibility metric using the communication unit 210 illustrated in FIG. 2. In this regard, pilots having corresponding receiving equipment may receive the broadcasts and may obtain the atmospheric visibility metrics.

In some embodiments, the atmospheric visibility metrics are incorporated and/or aggregated into signals typically broadcast by an airport such as, but not limited to, METAR data or ASOS data.

The received atmospheric visibility metrics may be displayed or otherwise provided to a pilot in any form. For example, the atmospheric visibility metrics may be displayed on a display device. Further, the display device may include a user interface such that a pilot may interact with the data and display selected information. In some embodiments, atmospheric visibility metrics or associated data are incorporated and/or aggregated into signals suitable for display on an electronic flight bag.

In some embodiments, the method 400 may include providing instructions or feedback associated with the atmospheric visibility metrics. For example, the method 400 may include determining an altitude along the glideslope at which a pilot may expect to visualize a landing environment (e.g., unaided based on atmospheric visibility at visible wavelengths or with the assistance of an EVS at corresponding operational wavelengths). By way of another example, the method 400 may include determining whether an approach is supported based on the atmospheric visibility at any wavelength or combination of wavelengths.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An airfield visibility monitoring system comprising:
a measurement unit configured to emit one or more pulses of electromagnetic radiation along an aircraft glideslope associated with a runway and detect backscattered radiation from the glideslope associated with the emitted one or more pulses of electromagnetic radiation, wherein the measurement unit is further configured to determine round-trip times between emission of the one or more pulses of electromagnetic radiation and detection of the backscattered radiation, wherein the measurement unit is time-gated and provides signals for a plurality of time ranges corresponding to a plurality of distance ranges from the measurement unit along the glideslope, wherein backscattered radiation detected within each of the plurality of time ranges is integrated, wherein intensities of the one or more pulses of electromagnetic radiation associated with the plurality of distance ranges are selected to increase with increasing distance from the measurement unit to provide a constant signal to noise ratio for at least a portion of the plurality of distance ranges; and
a controller communicatively coupled to the measurement unit and an airfield communication unit, the controller including one or more processors configured to execute program instructions causing the one or more processors to:
determine values of a visibility metric for the plurality of distance ranges from the measurement unit along the glideslope based on the detected backscattered radiation and the round-trip times;
determine values of the visibility metric for a plurality of altitudes based on the values of the visibility metric along the glideslope; and
direct the airfield communication unit to broadcast values of the visibility metric for at least some of the plurality of altitudes.

2. The airfield visibility monitoring system of claim 1, wherein the measurement unit comprises:
an emitter configured to emit the one or more pulses of electromagnetic radiation;
a receiver located adjacent to the emitter and configured to detect the backscattered radiation from the glideslope associated with the emitted one or more pulses of electromagnetic radiation; and
a timing unit to determine the round-trip times between emission of the one or more pulses of electromagnetic radiation by the emitter and detection of the backscattered radiation by the receiver.

3. The airfield visibility monitoring system of claim 1, wherein at least some of the one or more pulses of electromagnetic radiation comprise visible wavelengths.

4. The airfield visibility monitoring system of claim 1, wherein at least some of the one or more pulses of electromagnetic radiation comprise infrared wavelengths.

5. The airfield visibility monitoring system of claim 1, wherein at least some of the one or more pulses of electromagnetic radiation comprise wavelengths associated with an enhanced vision system.

6. The airfield visibility monitoring system of claim 1, wherein a first set of the one or more pulses of electromagnetic radiation comprise visible wavelengths, wherein a second set of the one or more pulses of electromagnetic radiation comprise wavelengths associated with an enhanced vision system, wherein the one or more processors are further configured to execute program instructions causing the one or more processors to:
determine values of the visibility metric at the visible wavelengths and the wavelengths associated with the enhanced vision system for the plurality of distance ranges from the measurement unit along the glideslope based on the detected backscattered radiation;
determine values of the visibility metric at the visible wavelengths and the wavelengths associated with the enhanced vision system for a plurality of heights above ground level based on the values of the visibility metric at the visible wavelengths and the wavelengths associated with the enhanced vision system for the plurality of distance ranges from the measurement unit along the glideslope; and
direct the airfield communication unit to broadcast values of the visibility metric at the visible wavelengths and at the wavelengths associated with the enhanced vision system for at least some of the plurality of heights above ground level.

7. The airfield visibility monitoring system of claim 6, wherein the at least some of the plurality of heights above ground level comprise:
 a height above ground level associated with a decision height for an approach.

8. The airfield visibility monitoring system of claim 1, wherein the one or more processors are further configured to execute program instructions causing the one or more processors to:
 direct the airfield communication unit to broadcast an indicator of whether an approach based on visibility at wavelengths associated with the one or more pulses of electromagnetic radiation is supported.

9. The airfield visibility monitoring system of claim 1, wherein the one or more processors are further configured to execute program instructions causing the one or more processors to:
 determine a height above ground level along the glideslope at which a runway environment is expected to be visible at wavelengths associated with the one or more pulses of electromagnetic radiation based on the values of the visibility metric for the plurality of altitudes; and
 direct the airfield communication unit to broadcast the height above ground level along the glideslope at which the runway environment is expected to be visible.

10. The airfield visibility monitoring system of claim 1, wherein the visibility metric comprises a value of an atmospheric extinction coefficient.

11. The airfield visibility monitoring system of claim 1, wherein determining values of the visibility metric for the plurality of distance ranges from the measurement unit along the glideslope based on the detected backscattered radiation comprises:
 determining values of an atmospheric extinction coefficient at wavelengths associated with the one or more pulses of electromagnetic radiation for the plurality of distance ranges from the measurement unit along the glideslope based on the detected backscattered radiation; and
 determining values of an additional visibility metric at wavelengths associated with the one or more pulses of electromagnetic radiation for the plurality of distance ranges from the measurement unit along the glideslope based on the values of the atmospheric extinction coefficient.

12. The airfield visibility monitoring system of claim 11, wherein the additional visibility metric comprises a value of a meteorological visibility.

13. The airfield visibility monitoring system of claim 11, wherein the additional visibility metric comprises a value of a runway visual range.

14. An airfield visibility monitoring system comprising:
 a measurement unit configured to emit one or more pulses of electromagnetic radiation along an aircraft glideslope associated with a runway and detect backscattered radiation from the glideslope associated with the emitted one or more pulses of electromagnetic radiation, wherein the measurement unit is further configured to determine round-trip times between emission of the one or more pulses of electromagnetic radiation and detection of the backscattered radiation, wherein the measurement unit is time-gated and provides signals for a plurality of time ranges corresponding to a plurality of distance ranges from the measurement unit along the glideslope, wherein intensities of the one or more pulses of electromagnetic radiation emitted by the measurement unit associated with the plurality of distance ranges are selected to increase with increasing distance from the measurement unit to provide a constant signal to noise ratio for at least a portion of the plurality of distance ranges; and
 a controller communicatively coupled to the measurement unit and an airfield communication unit, the controller including one or more processors configured to execute program instructions causing the one or more processors to:
  determine values of a visibility metric for at least an altitude corresponding to a decision height for an approach to the runway; and
  direct the airfield communication unit to broadcast values of the visibility metric for the decision height.

15. The airfield visibility monitoring system of claim 14, wherein a first set of the one or more pulses of electromagnetic radiation comprise visible wavelengths, wherein a second set of the one or more pulses of electromagnetic radiation comprise wavelengths associated with an enhanced vision system, wherein the one or more processors are further configured to execute program instructions causing the one or more processors to:
 determine values of the visibility metric at the visible wavelengths and at the wavelengths associated with the enhanced vision system for the plurality of distance ranges from the measurement unit along the glideslope based on the detected backscattered radiation;
 determine values of the visibility metric at the visible wavelengths and the wavelengths associated with the enhanced vision system for a plurality of heights above ground level based on the values of the visibility metric at the visible wavelengths and at the wavelengths associated with the enhanced vision system for the plurality of distance ranges from the measurement unit along the glideslope; and
 direct the airfield communication unit to broadcast values of the visibility metric at the visible wavelengths and at the wavelengths associated with the enhanced vision system for at least some of the plurality of heights above ground level.

16. The airfield visibility monitoring system of claim 1, wherein the visibility metric comprises a value of an atmospheric extinction coefficient.

17. A method for monitoring airfield visibility comprising:
 emitting one or more pulses of electromagnetic radiation along an aircraft glideslope associated with a runway with a measurement unit;
 detecting backscattered radiation from the glideslope associated with the emitted one or more pulses of electromagnetic radiation by the measurement unit using time-gating to provide signals for a plurality of time ranges corresponding to a plurality of distance ranges from the measurement unit along the glideslope, wherein the backscattered radiation detected within each of the plurality of time ranges is integrated, wherein intensities of the one or more pulses of electromagnetic radiation associated with the plurality of distance ranges are selected to increase with increasing distance from the measurement unit to provide a constant signal to noise ratio for at least a portion of the plurality of distance ranges;

determining values of a visibility metric for the plurality of distance ranges from the measurement unit along the glideslope based on the detected backscattered radiation and round-trip times;

determining values of the visibility metric for a plurality of altitudes based on the values of the visibility metric for the plurality of distance ranges from the measurement unit along the glideslope; and broadcasting values of the visibility metric for at least some of the plurality of altitudes.

18. The method for monitoring airfield visibility of claim 17, wherein determining values of the visibility metric for the plurality of distance ranges from the measurement unit along the glideslope based on the detected backscattered radiation and the round-trip times comprises:

determining values of the visibility metric for a first set of the one or more pulses of electromagnetic radiation including visible wavelengths; and determining values of the visibility metric at a second set of the one or more pulses of electromagnetic radiation including wavelengths associated with an enhanced vision system, wherein the broadcasting values of the visibility metric for at least some of the plurality of altitudes comprises:

broadcasting values of the visibility metric for at least some of the plurality of altitudes associated with the first set of wavelengths and the second set of wavelengths.

19. The airfield visibility monitoring system of claim 14, wherein the detected backscattered radiation within each of the plurality of time ranges is integrated.

* * * * *